Patented Mar. 18, 1952

2,589,447

UNITED STATES PATENT OFFICE 2,589,447

PRODUCTION OF SILALACTONES AND OF DISILOXANE DIBASIC ACIDS

Leo Harry Sommer, State College, Pa., assignor to Dow Corning Corporation, Midland, Mich., a corporation of Michigan No Drawing. Application April 13, 1950, Serial No. 155,786. In Great Britain June 30, 1949

2 Claims. (Cl. 260—448.2)

The present invention relates to organosilicon compounds and methods for their production.

In particular, the present invention relates to the production of silalactones and of disiloxane dibasic acids.

In accordance with the present invention, compounds of the formula $$C_6H_5(CH_3)_2Si(CH_2)_nCOOH$$

are treated with an aqueous acid which has a dissociation constant of at least $1.1 \times 10^{-2}$. Acids of this type include hydrochloric, sulfuric, phosphoric and nitric acids. By this treatment, which is effected at a temperature above 40° C., the phenyl radical is cleaved from the silicon and is replaced by hydroxyl. The hydroxyl radicals of two molecules intercondense to form the disiloxane. Also the hydroxyl radical on the silicon condenses with the carboxyl radical of the acid to close a lactone ring including the silicon atom. These two types of products respectively are as follows:

$$[HOOC(CH_2)_nSi(CH_3)_2]_2O \quad (I)$$

and

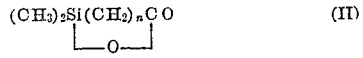
(II)

This invention further relates to compounds so prepared in which compounds $n$ has an average value of from 2 to 5 inclusive.

The dimethylphenylsilyl-substituted propionic to caproic acids may be prepared by the malonic ester synthesis. In the synthesis the sodium salt of diethyl malonate is reacted with a dimethylphenylsilane in which the fourth substituent on the silicon is a halogenoalkyl from halogenomethyl to halogeno-n-putyl. The reaction thereof forms the diethyl malonate derivative of the dimethylphenylalkylsilane. This ester, in accordance with conventional methods, as employed in the malonic ester synthesis in hydrocarbon chemistry, may be saponified, hydrolyzed and decarboxylated, whereby the chain length of the fourth halogenoalkyl radical on the silicon is increased by two carbon atoms, with the last carbon being that of a carboxyl radical.

These acids may likewise be produced by the acetoacetic ester synthesis. In this synthesis the silanes described in connection with the malonic ester synthesis are reacted with the sodium salt of ethyl acetoacetate. These acetoacetate derivatives may then be saponified, the aceto group removed and hydrolyzed, all in accordance with known methods employed in acetoacetic ester syntheses as known in hydrocarbon chemistry. By this procedure the same series of acids is produced as is produced by the malonic ester synthesis.

A third method for the production of the acids in which $n$ has a value of from 3 to 5 involves the preparation of the Grignard reagent of a dimethylphenylsilane in which the fourth substituent is an omega-halogen-substituted n-propyl, n-butyl or n-amyl radical. The Grignard reagent is then reacted with carbon dioxide, and the complex so formed is hydrolyzed to form the corresponding acid.

The reaction for effecting dephenylation of the acids so produced proceeds rapidly and without any substantial difficulty upon heating these organosilicon acids with the above-indicated mineral acids at a temperature above 40° C.

When the malonic ester type of synthesis is employed for the silane acid, it is convenient to shorten the preparative steps by heating the sodium salt of the silyl-substituted malonic acid with the mineral acid. Thus, in this process the compound $$C_6H_5(CH_3)_2Si(CH_2)_nCH(COONa)_2 \quad (III)$$

is heated with an acid of the defined dissociation constant, in amount more than sufficient to neutralize the salt. In this step the salt is neutralized and dephenylation occurs, followed by removal of one carboxy radical from the malonic acid. The dephenylation progresses to an extent depending upon the time of heating in the presence of the mineral acid.

Lactone of Formula II may be separated by extraction of the product so formed with an organic solvent. Disiloxane diacid of Formula I may be crystallized by allowing the acid-treated material to stand. Non-dephenylated material having the formula $$C_6H_5(CH_3)_2Si(CH_2)_nCOOH \quad (IV)$$

will remain after the separation of the desired products.

The lactone may be hydrolyzed and condensed to convert it to the disiloxane diacid. Also the disiloxane diacid may be subjected to distillation whereby to obtain the lactone. In general, both the lactone and the disiloxane diacid may be obtained from materials of the general Formula IV, independently of the value of $n$.

The disiloxane diacids hereof of general Formula I may be employed, if desired, as emulsifying agents for methylpolysiloxane fluids in water. For this purpose these materials may be employed in the form of the alkali metal or quaternary ammonium salts.

Example 1

Diethyl phenyldimethylsilylmethylmalonate, in amount of 63 grams, was added to 40 grams of potassium hydroxide in 40 ml. of water and heated to 80° C. for two hours. 20 ml. of water was added and the ethanol was distilled. 60 ml. of concentrated hydrochloric acid was added and the mixture was refluxed for one hour. The water layer was removed and the other layer was heated at 150° C. for six hours. 30 ml. of benzene was added and the water removed by distillation. The residue was fractionally distilled. The products obtained upon distillation were as follows:

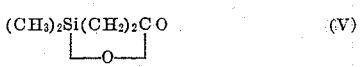    (V)

and $C_6H_5(CH_3)_2Si(CH_2)_2COOH$    (VI)

The compound V was exposed to moist air and thereby converted to the compound $[HOOC(CH_2)_2Si(CH_3)_2]_2O$    (VII)

Example 2

Compound VI was heated with 30 per cent sulfuric acid under reflux for one hour. Benzene was removed during the heating. The reaction product was allowed to stand and compound VII precipitated.

Example 3

The diethyl ester of compound I was prepared as follows: 65 grams of the ethyl ester of VI was mixed with 125 ml. of ethanol and 17 ml. of 95 per cent sulfuric acid. The mixture was refluxed for two hours with the head temperature of the column being 78° C. The benzene and ethanol were then distilled off by removing the mixture of the two at the top of the reflux column at a temperature of 70° C. The residue was washed with 50 ml. of saturated aqueous potassium carbonate. The aqueous layer was separated from the remaining material, which later was dried over sodium sulfate. Remaining solvent was distilled from the dried residue. The residue was then fractionally distilled, whereby the diethyl ester of compound I was obtained. This compound has the following properties:

$d_{20}$ _____ 0.9788
B. P.° C _____ 94/1 mm.
$n_D^{20}$ _____ 1.4341

This compound may be saponified with sodium hydroxide and the saponification product hydrolyzed to produce compound VII.

That which is claimed is:

1. The method of selectively cleaving a phenyl radical from a compound of the general formula $C_6H_5(CH_3)_2Si(CH_2)_nCOOH$ where $n$ has an average value of from 2 to 5, inclusive, which comprises mixing said compound with an aqueous acid which has a dissociation constant of at least 1.1 times $10^{-2}$, whereby the phenyl radical is cleaved from the silicon atom with the formation of a silane ester of said acid.

2. The method in accordance with claim 1, in which said silane ester of said acid is hydrolyzed, whereby the acid radical is replaced by a hydroxyl radical on the silicon and in which the hydrolysis product so formed is condensed.

LEO HARRY SOMMER.

No references cited.